United States Patent
McCaughey et al.

(10) Patent No.: US 10,938,431 B2
(45) Date of Patent: Mar. 2, 2021

(54) WIRELESS EARBUD COVER WITH ANTENNA ELEMENT

(71) Applicant: Penumbra Brands, Inc., North Salt Lake, UT (US)

(72) Inventors: Ryan McCaughey, Encinitas, CA (US); Kevin Wolentarski, Encinitas, CA (US)

(73) Assignee: Penumbra Brands, Inc., North Salt Lake, UT (US)

( * ) Notice: Subject to any disclaimer, the term of this patent is extended or adjusted under 35 U.S.C. 154(b) by 0 days.

(21) Appl. No.: 16/510,472

(22) Filed: Jul. 12, 2019

(65) Prior Publication Data

US 2021/0013917 A1    Jan. 14, 2021

(51) Int. Cl.
| | | |
|---|---|---|
| *H01Q 1/24* | (2006.01) | |
| *H04B 1/3827* | (2015.01) | |
| *H01Q 1/27* | (2006.01) | |
| *H04B 5/00* | (2006.01) | |

(52) U.S. Cl.
CPC ........... *H04B 1/3838* (2013.01); *H01Q 1/273* (2013.01); *H04B 1/385* (2013.01); *H04B 5/0006* (2013.01); *H04B 2001/3866* (2013.01)

(58) Field of Classification Search
CPC ............................ H04B 1/3838; H04B 1/385
See application file for complete search history.

(56) References Cited

U.S. PATENT DOCUMENTS

| | | | |
|---|---|---|---|
| 8,208,980 B2 | 6/2012 | Wong et al. | |
| 8,466,839 B2 | 6/2013 | Schlub et al. | |
| 9,030,373 B2 | 5/2015 | Sim | |
| 9,736,564 B2 | 8/2017 | Kurtz | |
| 10,090,875 B2 | 10/2018 | McCaughey et al. | |
| 2002/0097189 A1 | 7/2002 | Coloney | |
| 2003/0002691 A1 | 1/2003 | Ono et al. | |
| 2005/0090299 A1 | 4/2005 | Tsao et al. | |
| 2007/0036383 A1 | 2/2007 | Romero | |
| 2010/0264927 A1* | 10/2010 | Viswanathan | G01R 33/3415 324/318 |
| 2013/0099956 A1 | 4/2013 | Fratti | |
| 2017/0264332 A1 | 9/2017 | Leibovich | |
| 2017/0339482 A1* | 11/2017 | Schrems | H04M 1/0249 |
| 2018/0310089 A1 | 10/2018 | Yun | |
| 2020/0091590 A1* | 3/2020 | Su | G06F 1/163 |

OTHER PUBLICATIONS

Miclaus, S., Mihai, G., Aron, A. M. et al (2017). Shielding Efficiency of a Fabric Based on Amorphous Glass-covered Magnetic Microwires to Radiation Emitted by a Mobile Phone in 2G and 3G Communication Technologies. Land Forces Academy Review, vol. XXII, No. 4 (88), pp. 289-297. See Abstract; figure 1; and sections 1-4.

* cited by examiner

*Primary Examiner* — Tuan H Nguyen

(74) *Attorney, Agent, or Firm* — Holland & Hart LLP

(57) ABSTRACT

An apparatus may include a cover configured to couple with a wireless earbud, and a conductive element positioned in the cover. The conductive element may be configured to parasitically couple with an antenna of the wireless earbud when the antenna is energized. the conductive element may be configured to direct radio frequency energy away from a user of the wireless earbud.

18 Claims, 3 Drawing Sheets

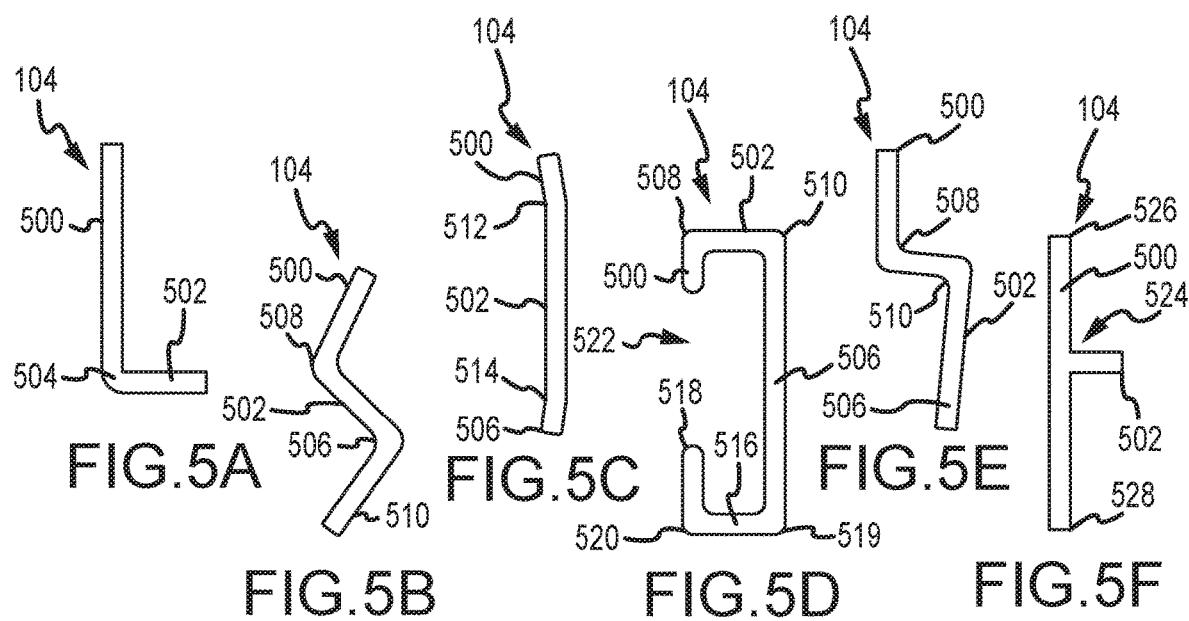
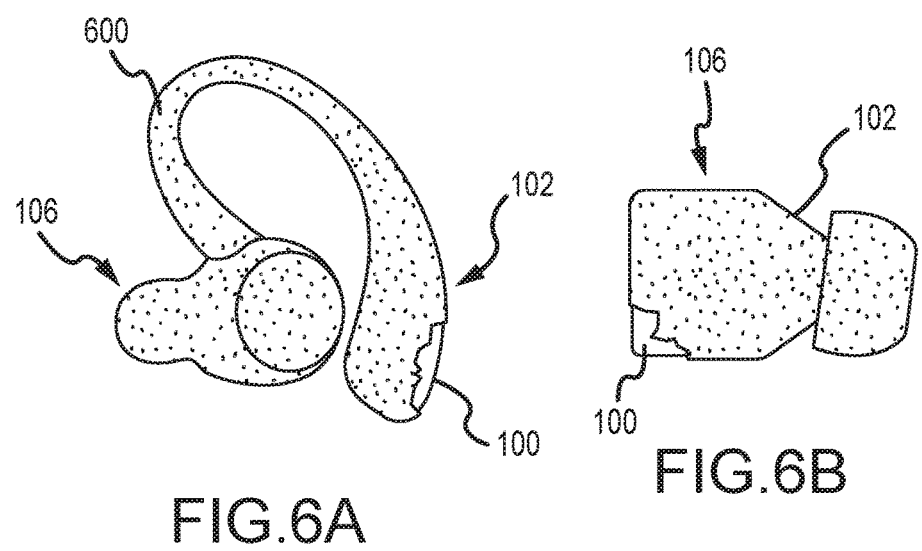

US 10,938,431 B2

WIRELESS EARBUD COVER WITH ANTENNA ELEMENT

BACKGROUND

This disclosure relates generally to wireless devices such as earbuds or other types of wireless devices, and specifically to covers for wireless earbuds. Radio frequency radiation from wireless devices may cause a health risk due to the amount of radiation that is proximate a user. Some are concerned that such radiation may cause burns, sickness, cancer, or damage to cells.

SUMMARY

In some embodiments, an apparatus may include a cover configured to couple with a wireless earbud, and a conductive element positioned in the cover and configured to parasitically couple with an antenna of the wireless earbud when the antenna is energized and direct radio frequency energy away from a user of the wireless earbud.

The conductive element may be configured to reduce a specific absorption rate experienced by the user of the wireless earbud when the wireless earbud is worn by the user and the cover is coupled with the wireless earbud. The conductive element may be configured to reduce a specific absorption rate experienced by the user of the wireless earbud by at least 20 percent without adversely affecting the wireless earbud antenna's transmit or receive performance when the wireless earbud is worn by the user and the cover is coupled with the wireless earbud. The conductive element may be configured to inductively couple, or capacitively couple, or both with a second antenna of the wireless earbud configured to transmit or receive signals for the wireless earbud.

The conductive element may be positioned in a portion of the cover over a stem of the wireless earbud when the cover coupled with the wireless earbud. The conductive element may be positioned in an extension that extends a length of a stem when the cover is coupled with the wireless earbud. The conductive element may be positioned in a portion of the cover over a body portion of the wireless earbud.

The conductive element may be positioned in a portion of the cover located on a distal side of the wireless earbud away from the user when the user is wearing the wireless earbud. The conductive element may be configured to decrease the near field radio frequency radiation of the wireless earbud while positioned in an ear of the user. The conductive element may include an electrically conductive material incorporated into the cover. The conductive element may be configured to improve a strength of a signal received or transmitted by a second antenna of the wireless earbud.

The apparatus may include a second conductive element positioned in the cover and configured to cooperate with the conductive element positioned in the cover to direct radio frequency energy away from the user of the wireless earbud when the antenna is energized and the user is wearing the wireless earbud. The cover may include an extension configured to extend a length of a stem of the wireless earbud.

In some embodiments, a system may include a wireless earbud that may be positionable in an ear of user where the wireless earbud includes a housing and a first antenna positioned inside of the housing. The first antenna may be configured to communicate signals to and from the wireless earbud. The system may further include a cover configured to couple with the wireless earbud, and a second antenna positioned in the cover and configured to direct radio frequency energy away from the user of the wireless earbud.

The second antenna may be positioned outside of the housing of the wireless earbud when the cover is coupled with the wireless earbud. The second antenna of the cover may be configured to inductively, capacitively, or parasitically couple with the first antenna of the wireless earbud. The wireless earbud may include a body including a speaker and a stem extending away from for the body.

The second antenna may be configured to reduce a Specific Absorption Rate (SAR) experienced by the user of the wireless earbud when the wireless earbud is worn by the user and the cover is coupled with the wireless earbud. The second antenna may be configured to reduce a specific absorption rate experienced by the user of the wireless earbud by at least 20 percent without adversely affecting a Total Radiated Power (TRP) or Total Isotropic Sensitivity (TIS) of the wireless earbud when the wireless earbud is worn by the user and the cover is coupled with the wireless earbud.

In some embodiments, an apparatus may include a cover configured to couple with a wireless earbud, and an antenna positioned in the cover and configured to direct radio frequency energy away from a user of the wireless earbud, the antenna configured to improve a strength of a signal received or transmitted by a second antenna of the wireless earbud.

BRIEF DESCRIPTION OF THE DRAWINGS

FIG. 5A illustrates an example of a conductive element in accordance with aspects of the present disclosure.

FIG. 5B illustrates an example of a conductive element in accordance with aspects of the present disclosure.

FIG. 5C illustrates an example of a conductive element in accordance with aspects of the present disclosure.

FIG. 5D illustrates an example of a conductive element in accordance with aspects of the present disclosure.

FIG. 5E illustrates an example of a conductive element in accordance with aspects of the present disclosure.

FIG. 5F illustrates an example of a conductive element in accordance with aspects of the present disclosure.

FIG. 6A illustrates an example of an earbud and a cover in accordance with aspects of the present disclosure.

FIG. 6B illustrates an example of an earbud and a cover in accordance with aspects of the present disclosure.

DETAILED DESCRIPTION

Radio frequency radiation from earbuds or other types of wireless devices may be a health risk due to the amount of radiation that is proximate a user. At the same time, due to increased amounts of demand for more power and functionality in such wireless devices, full use of the available radio frequency is desirable for such devices. Wireless earbuds transmit radio frequency energy, typically following Bluetooth® protocol, to communicate with a nearby wireless device while situated in the user's ear. The user may be exposed to potentially harmful radio frequency radiation for long periods of time from the earbud transmitter.

The apparatus and techniques described herein may use a conductive element that is independent of an earbud to parasitically redirect the radio frequency transmitted by the earbud away from the user. The conductive element may be secured to a cover that fits around wireless earbuds. The cover may be formed to the shape and size of the earbuds. In some examples, the cover is a tight fitting skin surrounding the wireless earbuds and/or is a flexible cover. The cover may incorporate a parasitic antenna that is configured to couple with the internal antenna of the wireless earbud and direct radio frequency energy away from the user and thereby reduce the specific absorption rate (SAR) of the user wearing the wireless earbud.

The cover of the wireless earbud may be installed over the body of the earbud or just a portion of the body of the earbud containing the transmitting antenna. With the cover installed around the transmitting portion of the earbud, the user may continue to use the wireless earbuds as intended. The cover with the conductive element may be configured to reduce the amount of radio frequency radiation exposure to the user from the earbud's transmitter.

The cover may be constructed of a flexible insulating material that conforms to the shape of the features of a specific wireless earbud. The wireless earbud may be able to slip into wireless earbud cover or the cover may be an adhesive film, for example, vinyl, that attaches to the earbud.

The cover may have one or more conductive elements that are electrically-conductive and/or parasitic integrated within the cover or may be printed on the cover. The conductive elements may be positioned and tuned to capacitively and/or inductively couple with the transmitting antenna of the wireless earbuds. The conductive elements may be constructed to decrease the near field radio frequency radiation from the wireless earbud while positioned in the ear of the user.

Figure 1:
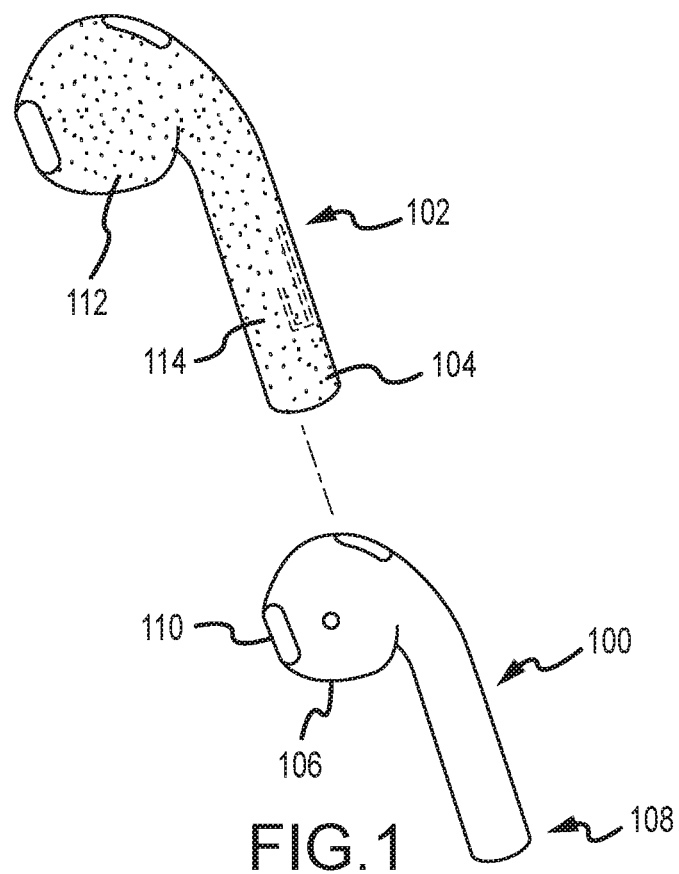
FIG. 1 illustrates an example of an exploded view of an earbud and a cover in accordance with aspects of the present disclosure.

FIG. 1 illustrates an example of an exploded view of an earbud 100 and a cover 102. The cover 102 is sized and shaped to cover and/or surround the shape of the earbud 100. A conductive element 104 may be incorporated with the cover 102.

The earbud 100 may include any desirable shape. In the illustrated example, the earbud 100 includes a body 106, a stem 108, and a speaker 110. In some cases, the body 106 of the earbud 100 can fit directly in a user's outer ear. In some cases, the body 106 of the earbud 100 faces the ear canal, but not inserted in the ear canal. In other examples, the body 106 of the earbud 100 can be inserted into the ear canal. The speaker 110 may be disposed within the body 106 of the earbud 100 and be oriented to direct sound into the user's ear.

The stem 108 may be a structure that extends away from the body 106 of the earbud 100. In some cases, the stem 108 may be referred to as a boom. In some examples, the earbud 100 includes a stem 108, and in other examples, the earbud 100 does not include a stem 108. In those examples with a stem 108, the stem 108 may provide a space to house components of the earbud 100, such as circuitry, batteries, receives, transceivers, antennas, filters, memory, processors, data storage, read-only memory, random access memory, other types of electronics, other types of components, or other types of features. In some examples, the stem 108 may provide a surface area for gripping the earbud 100 that the user may use to handle the earbud 100 when inserting the earbud 100 into the user's ear or when removing the earbud 100. In those examples without a stem 108, the electronics, components, or other features that have been described associated with the stem 108 may be associated with and/or housed in the body 106 of the earbud 100.

The earbud 100 is a wireless earbud where data is transmitted wireless over radio frequency spectrum bands. The wireless energy may be transmitted with any appropriate type of communication protocol in accordance with the principles described in the present disclosure. Such protocols may include standard wireless protocols, protocols used by Bluetooth® technologies, Wi-Fi protocols, Z-wave protocols, Zigbee protocols, other types of wireless protocols, 3G, 4G, 5G, or combinations thereof.

The cover 102 may be sized and shaped to cover at least a portion of the outer surface of the earbud 100. For example, the cover 102 may include a fabric, plastic, metal, composite, or another type of material. The material of the cover 102 may be a single layer or multiple layers exhibiting different types of properties. The cover 102 may be a non-rigid container that forms a hollow space that is sized and shaped to contain the earbud 100. In some examples, the cover 102 may be a sleeve with at least one open end that allows the sides of the cover 102 to be pulled over the outer surface of the earbud 100. In such examples, the open end may remain open while the user has the earbud 100 inserted into his or her ear. In some cases, the open end or other type of opening may be closed after the earbud 100 has been inserted inside. The opening may be closed with any appropriate type of fastener, such as a zipper, snaps, Velcro®, magnets, drawstring, another type of fastener, or combinations thereof.

In examples where the earbud 100 includes a body portion 112, the cover 102 may cover at least a portion of the body 106 of the earbud 100. In some examples, the cover 102 is configured to cover the entire outer surface of the earbud 100. But, in other examples, the cover 102 may be configured to cover just a portion of the earbud 100. In some examples where the earbud 100 includes a stem 108, the cover 102 may cover just a portion of the stem 108 and not a portion of the body 106 of the earbud 100. Alternatively, in examples where the earbud 100 includes a stem 108, the cover 102 may cover just a portion of the body 106 and not a portion of the stem 108 of the earbud 100. In other examples where the earbud 100 includes no stem, the cover 102 may cover the entire body 106 of the earbud 100 or just a portion of the earbud 100. Further, in some examples where the earbud 100 includes body 106 and a stem 108, the cover 102 may include a body portion 112 that is configured to cover the body 106 of the earbud 100, and the cover 102 may also include a stem portion 114 that is configured to cover the stem 108 of the earbud 100.

A conductive element 104 may be incorporated into the cover 102. In some examples, the conductive element 104 is configured to affect the radio frequency radiation emitted from the internal antenna of the earbud 100. In some cases, the conductive element 104 is positioned adjacent to the internal antenna that is housed within the earbud 100. In other examples, the conductive element 104 is positioned away from the internal antenna housed in the earbud 100.

The conductive element 104 may be situated on the inside of the cover 102, on the outside of the cover 102, or embedded into a thickness of the material of the cover 102. In some cases, the cover 102 is made of a plastic and the conductive element 104 is molded into the plastic of the cover 102. In other examples, the conductive element 104 is an electrically conductive fiber that is woven into the fibers of the cover 102. In some cases, the conductive element 104 may be adhered, glued, fixed, or otherwise attached to the outside of the cover 102.

Figure 2:
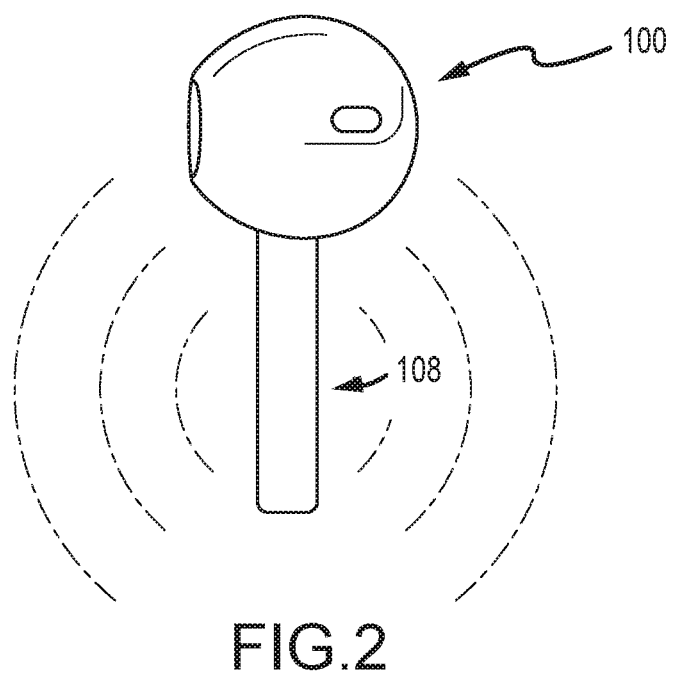
FIG. 2 illustrates an example of an earbud without a cover in accordance with aspects of the present disclosure.

FIG. 2 illustrates an example of an earbud 100 without a cover (e.g., cover 102 described with reference to FIG. 1). In this example, the radio frequency may be broadcast from an internal antenna (not shown) located in the stem 108 of the earbud 100. In this example, the radio frequency radiation is broadcast substantially in all directions. Thus, in situations where the internal antenna of the earbud 100 is inserted into an ear of a user, the radio frequency radiation is also transmitted in the direction of the user. In some examples, a level of radiation from the earbud 100 may be unhealthy for the user.

Figure 3:
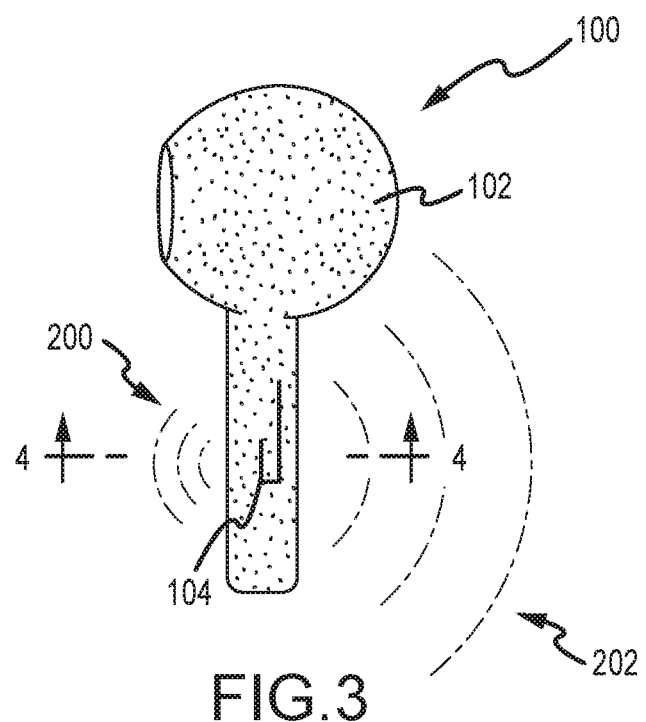
FIG. 3 illustrates an example of an earbud with a cover that includes a conductive element in accordance with aspects of the present disclosure.

FIG. 3 illustrates an example of an earbud 100 disposed within a cover 102. In this example, the internal antenna of the earbud 100 is transmitting radio frequency radiation outwardly. The conductive element 104 of the cover 102 affects the direction of the radio frequency. In this example, a portion of the radio frequency is minimized in a first direction 200 and redirected in a second direction 202. In some cases, the first direction 200 is going towards the user, and the second direction 202 is going away from the user.

The conductive element 104 of the cover 102 may be configured to parasitically couple with the internal antenna of the wireless earbud 100 when the antenna is energized and directing radio frequency energy. This parasitic coupling may direct at least a portion of the radio frequency energy away from the user of the wireless earbud 100. The conductive element 104 may be configured to reduce a specific absorption rate experienced by the user of the wireless earbud 100 when the wireless earbud 100 is worn by the user and the cover 102 is coupled with the wireless earbud 100. Further, the conductive element 104 may be configured to reduce a specific absorption rate experienced by the user of the wireless earbud 100 by at least 20 percent without adversely affecting a total radiation power (TRP) of the wireless earbud 100 when the wireless earbud 100 is worn by the user and the cover 102 is coupled with the wireless earbud 100. In other examples, the specific absorption rate may be reduced by at least 30 percent, by least 40 percent, by at least 50 percent, by at least 60 percent, by at least 70 percent, by at least 80 percent, by at least 90 percent, by at least another appropriate percentage, or combinations thereof.

The conductive element 104 may be configured to inductively couple, capacitively couple, or both with the internal antenna of the wireless earbud 100. In some cases, the conductive element 104 is configured to improve a strength of a signal received or transmitted by the internal antenna of the wireless earbud 100.

The conductive element 104 may be made of an electrically conductive material and may be electrically insulated from other electrically conductive structures, including components of the earbud 100, such as the internal antenna of the earbud 100. In some cases, the cover 102 is made of an electrical insulator that can prevent the electrically conductive element 104 of the cover 102 from making a physical connection to another electrically conductive material. In some cases, the electrically conductive element 104 of the cover 102 may make physical contact with the outside surface of the earbud 100 when the outside surface of the earbud 100 is electrically insulated from the internal antenna of the earbud 100. The conductive element 104 of the cover 102 may modify the radiation pattern of the radio waves emitted by the internal antenna of the earbud 100, directing the waves in a beam in one direction thereby increasing the antenna's gain in that direction. The conductive element 104 may be a passive resonator that absorbs the radio waves from the internal antenna where the electrically conductive element 104 re-radiates the waves in a different phase. In this example, the waves re-radiated from the conductive element 104 of the cover 102 strengthen the antenna's radiation in a direction away from the user and cancel out at least a portion of the waves in a direction towards the user.

In some examples, the conductive element 104 may be configured to be oriented to have its length be aligned, substantially parallel, or parallel to the internal antenna of the earbud 100. In some cases, at least a portion of the conductive element 104 is configured to be spaced apart from the internal antenna at a distance of less than an inch, less than half an inch, less than a quarter of an inch, less than a tenth of an inch, another appropriate length away from the internal antenna of the earbud 100, or combinations thereof. In some cases, the conductive element 104 is at least 10 centimeters long in length, at least 25 centimeters long in length, at least 50 centimeters long in length, at least an inch long in length, at least 1.5 inches long in length, at least 2 inches long in length, at least 3 inches long in length, another length, or combinations thereof.

In some cases, the internal antenna of the earbud 100 is a half-wave dipole where its length half a wavelength of the radio waves used. In these examples, the conductive element 104 may be a reflector-type that is slightly longer (around 5%) than a half-wavelength. In this example, the conductive element 104 may reflect the radio waves in the opposite direction. In another example, the conductive element 104 may be a director-type that is slightly shorter than a half-wavelength where the conductive element 104 increases the radiation in a given direction. In some cases, the cover 102 may include at least one conductive element 104 that is a reflector-type conductive element that is positioned on one side of the internal antenna of the earbud 100 and one or more director-type conductive elements on the other side of the earbud 100.

Figure 4:
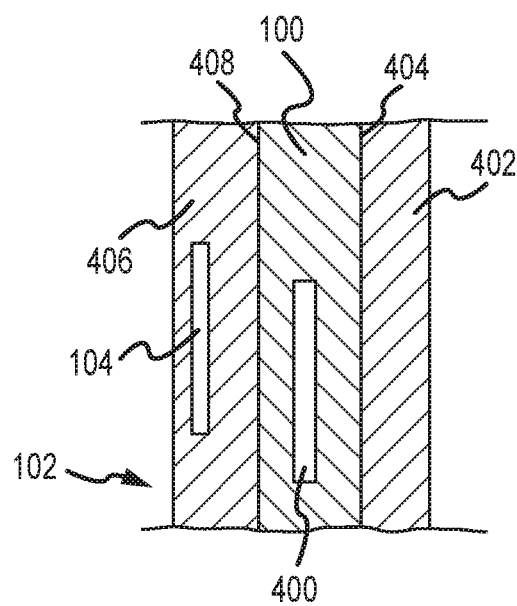
FIG. 4 illustrates an example of a cross sectional view of an earbud with a cover in accordance with aspects of the present disclosure.

FIG. 4 illustrates an example of a cross sectional view of a cover 102 and the earbud 100. In this example, the earbud 100 includes an internal antenna 400 disposed within a portion of the earbud 100. A first portion 402 of the cover 102 is located adjacent to a first side 404 of the earbud 100, and a second portion 406 of the cover 102 is located adjacent to a second side 408 of the earbud 100. A conductive element 104 is disposed within the second portion 406 of the cover 102. The conductive element 104 may cooperatively work with the internal antenna 400 of the earbud 100 to direct the radio frequency energy in a desired direction, such as a direction that is away from the user when the user has the earbud 100 installed in his or her ear.

FIGS. 5A-F illustrate multiple embodiments of conductive elements 104. FIG. 5A illustrates an example of a conductive element 104 includes a first element portion 500 and a second element portion 502 that are connected at a bend 504. In this example, the bend 504 has an angle that is substantially 90 degrees. While this example has been depicted with a substantially 90 degree angle, any appropriate angle may be incorporated into the conductive element 104. For example, the bend angle may be between 1 degree and 179 degrees. In some examples, the bend angle is between 25 degrees and 155 degrees. In another example, the bend angle may be between 50 degrees and 120 degrees. Additionally, in another example, the bend angle may be between 75 degrees and 110 degrees. The conductive element 104 of FIG. 5A generally resembles an "L-shape." In the illustrated example, the first element portion 500 is approximate twice as long as the second element portion 502.

FIG. 5B illustrates an example of a conductive element 104 containing a first element portion 500, a second element portion 502, and a third element portion 506. The first element portion 500 may be connected to the second element portion 502 at a first bend 508, and the second element portion 502 may be connected to the third element portion 506 at a second bend 510. In the illustrated example, the first element portion 500 and the third element portion 506 are generally aligned, and the second element portion 502 is generally oriented in a direction that is transverse the first element portion 500 and the third element portion 506 of the conductive element 104. In this example, the first bend 508 has a bend angle that is less than 90 degrees. However, the first bend angle may be any appropriate angle. The second bend 510 includes a bend angle that is approximately 90 degree. However, in other examples, the second bend 510 may include any appropriate angle. In some examples, the angles of the first bend 508 and the second bend 510 are approximately the same. However, in other examples, the angles of the first bend 508 and the second bend 510 may be substantially different angles. In the example of FIG. 5B, the conductive element 104 generally resembles is a "Z-shape." In this example, the first element portion 500, the second element portion 502, and the third element portion 506 generally have the same length. However, in other examples, each of the first element portion 500, the second element portion 502, and the third element portion 506 may have different lengths.

FIG. 5C illustrates an example of a conductive element 104 with a substantially linear shape. In this example, the conductive element 104 includes a first element portion 500, second element portion 502, and a third element portion 506. In this example, the conductive element 104 has a first slight bend 512 between the first element portion 500 and the second element portion 502. The conductive element 104 is also depicted with a second slight bend 514 between the second element portion 502 and the third element portion 506. In some examples, the conductive element 104 is a linear member without any slight or major bends.

FIG. 5D illustrates an example of a conductive element 104 containing a first element portion 500, a second element portion 502, a third element portion 506, a fourth element portion 516, and a fifth element portion 518. The first element portion 500 may be connected to the second element portion 502 at a first bend 508, and the second element portion 502 may be connected to the third element portion 506 at a second bend 510. The third element portion 506 may be connected to the fourth element portion 516 at a third bend 519, and the fourth element portion 516 may be connected to the fifth element portion 518 at a fourth bend 520.

In some examples, the first bend 508, the second bend 510, the third bend 519, and/or the fourth bend 520 may have a substantially 90 degree angles. In other examples, at least two of the first bend 508, the second bend 510, the third bend 519, and/or the fourth bend 520 have different angles. While this example depicts the bends as having 90 degree angles, each of the bends may individually include any appropriate angle. In the illustrated example of FIG. 5D, the conductive element 104 generally resembles a "C-shape." In this example, the first element portion 500, the third element portion 506, and the fifth element portion 518 are aligned with each other, while the second element portion 502 and the fourth element portion 516 are aligned with each other.

In this example, the first element portion 500 and the fifth element portion 518 generally extend towards each other, but are separated with a gap 522.

FIG. 5E illustrates an example of a conductive element 104 containing a first element portion 500, a second element portion 502, and a third element portion 506. The first element portion 500 may be connected to the second element portion 502 at a first bend 508, and the second element portion 502 may be connected to the third element portion 506 at a second bend 510. In the illustrated example, the first element portion 500 and the third element portion 506 are generally aligned, and the second element portion 502 is generally oriented in a direction that is transverse the first element portion 500 and the third element portion 506 of the conductive element 104. In this example, the first bend 508 has a bend angle that is less than 90 degrees. However, the first bend angle may be any appropriate angle. The second bend 510 includes a bend angle that is approximately 90 degree. However, in other examples, the second bend 510 may include any appropriate angle. In some examples, the angles of the first bend 508 and the second bend 510 are approximately the same. However, in other examples, the angles of the first bend 508 and the second bend 510 may be substantially different angles. In the example of FIG. 5E, the conductive element 104 generally resembles is a "step-shape." In this example, the first element portion 500 is approximately twice as long as the third element portion 506.

FIG. 5F illustrates an example of a conductive element 104 that includes a first element portion 500 and a second element portion 502. The second element portion 502 is connected to a midsection 524 of the first element portion 500 at a 90 degree angle. In this example, the second element portion 502 may be an electrically conductive protrusion. In alternative examples, additional electrically conductive protrusions may be attached to the midsection 524 of the first element portion 500. In yet other examples, at least one electrically conductive protrusions may be connected to multiple portions of the conductive element 104. For example, at least one electrically conductive protrusion may be connected to any of the first, second, third, fourth, or fifth element portions of any of the embodiments depicted in FIGS. 5A-5F.

In some examples, the electrically conductive protrusions may be connected to the midsection 524 of the appropriate element portion at an angle other than 90 degrees. For example, the electrically conductive protrusions may be connected to the midsections 524 at an angle between 1 degree and 90 degrees. In another example, the electrically conductive protrusion may be connected at an angle between 10 degrees and 80 degrees. In yet another example, the electrically conductive protrusions may be connected to a midsection 524 at an angle between 20 degrees and 70 degrees. Furthermore, in another example, the electrically conductive protrusions may be connected to the midsections 524 at an angle between 30 degrees and 60 degrees. In another embodiment, the electrically conductive protrusion may be connected to the midsection 524 at an angle between 40 degrees and 50 degrees. The midsection 524 may span between the first end 526 of the element portion and a second end 528 of the element portion that is opposite the first end of the element portion.

In some examples, the electrically conductive protrusion may be connected in approximately the center of the element section, while in other examples, the electrically conductive protrusion is connected near either the first end or the second end of the element portion. While the electrically conductive protrusion has been described as attaching to the element portion at certain locations, the electrically conductive protrusion may be attached to any appropriate location along the length of the element portion.

FIGS. 6A and 6B depict examples of earbuds 100 with associated covers 102. In the example of FIG. 6A, the wireless earbud 100 includes an earbud body 106 and a fixture 600 that wraps around a back side of the user's ear for stability. In this example, the cover 102 surrounds the body 106 and the fixture 600. However, in some examples, the cover 102 may surround just a portion of the earbud's body 106, just a portion of fixture 600, portions of the fixture 600 and the body 106 while exposing some portions of the earbud 100, or combinations thereof.

FIG. 6B illustrates an example of an earbud 100 without a stem or fixture. In this example, the wireless earbud 100 includes an earbud body 106, and a cover 102 that is configured to cover the earbud body 106.

While the examples above depict certain types of earbuds, any appropriate type of earbud may be used in accordance with the principles described in this disclosure. Further, while the covers described in this disclosure have been described with certain shapes and sizes, any appropriate type of cover may be used in accordance with the principles described herein to parasitically couple with an internal antenna of the wireless earbud. For example, in some cases, the cover may be a patch that covers just a single side of the wireless earbud. In other examples, the cover may surround opposing sides of the wireless earbud.

As used herein, the term "aligned" may mean parallel, substantially parallel, or forming an angle of less than 35.0 degrees. As used herein, the term "transverse" may mean perpendicular, substantially perpendicular, or forming an angle between 55.0 and 125.0 degrees. As used herein, the term "length" may mean the longest dimension of an object. As used herein, the term "width" may mean the dimension of an object from side to side. In some cases, the width of an object is orthogonal or transverse to the object's length.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed

What is claimed:

1. An apparatus, comprising:
   a cover configured to couple with an outer surface of a wireless earbud when the wireless earbud is worn by a user; and
   a conductive element positioned in the cover and configured to parasitically couple with an antenna inside of the outer surface of the wireless earbud when the antenna is energized and direct radio frequency energy away from the user of the wireless earbud, wherein the conductive element is configured to reduce a specific absorption rate (SAR) experienced by the user of the wireless earbud when the wireless earbud is worn by the user and the cover is coupled with the wireless earbud.

2. The apparatus of claim 1, wherein the conductive element is configured to reduce the SAR experienced by the user of the wireless earbud by at least 20 percent without adversely affecting a total radiated power (TRP) or Total Isotropic Sensitivity (TIS) of the wireless earbud when the wireless earbud is worn by the user and the cover is coupled with the wireless earbud.

3. The apparatus of claim 1, wherein the conductive element is configured to inductively couple, or capacitively couple, or both with a second antenna of the wireless earbud configured to transmit or receive signals for the wireless earbud.

4. The apparatus of claim 1, wherein the cover includes an extension configured to extend a length of a stem of the wireless earbud.

5. The apparatus of claim 1, wherein the conductive element is positioned in a portion of the cover over a stem of the wireless earbud when the cover coupled with the wireless earbud.

6. The apparatus of claim 1, wherein the conductive element is positioned in an extension that extends a length of a stem when the cover is coupled with the wireless earbud.

7. The apparatus of claim 1, wherein the conductive element is positioned in a portion of the cover over a body portion of the wireless earbud.

8. The apparatus of claim 1, wherein the conductive element is positioned in a portion of the cover located on a distal side of the wireless earbud away from the user when the user is wearing the wireless earbud.

9. The apparatus of claim 1, wherein the conductive element is configured to decrease the near field radio frequency radiation of the wireless earbud while positioned in an ear of the user.

10. The apparatus of claim 1, wherein the conductive element further comprises:

an electrically conductive material incorporated into the cover.

11. The apparatus of claim 1, wherein the conductive element is configured to improve a strength of a signal received or transmitted by a second antenna of the wireless earbud.

12. The apparatus of claim 1, further comprising:
a second conductive element positioned in the cover and configured to cooperate with the conductive element positioned in the cover to direct radio frequency energy away from the user of the wireless earbud when the antenna is energized and the user is wearing the wireless earbud.

13. A system, comprising:
a wireless earbud positionable in an ear of user, the wireless earbud including a housing and a first antenna positioned inside of the housing, the first antenna configured to communicate signals to and from the wireless earbud;
a cover configured to couple with an outer surface of the housing of the wireless earbud when the wireless earbud is worn by a user; and
a second antenna positioned in the cover and configured to direct radio frequency energy away from the user of the wireless earbud, wherein the second antenna is configured to reduce a specific absorption rate (SAR) experienced by the user of the wireless earbud when the wireless earbud is worn by the user and the cover is coupled with the wireless earbud.

14. The system of claim 13, wherein the second antenna is positioned outside of the housing of the wireless earbud when the cover is coupled with the wireless earbud.

15. The system of claim 13, wherein the second antenna of the cover is configured to inductively, capacitively, or parasitically couple with the first antenna of the wireless earbud.

16. The system of claim 13, wherein the wireless earbud comprises:
a body including a speaker; and
a stem extending away from for the body.

17. The system of claim 13, wherein the second antenna is configured to reduce the SAR experienced by the user of the wireless earbud by at least 20 percent without adversely affecting a total radiation power (TRP) of the wireless earbud when the wireless earbud is worn by the user and the cover is coupled with the wireless earbud.

18. An apparatus, comprising:
a cover configured to couple with an outer surface of a wireless earbud when the wireless earbud is worn by a user; and
an antenna positioned in the cover and configured to direct radio frequency energy away from the user of the wireless earbud when the wireless earbud is worn by the user, the antenna configured to improve a strength of a signal received or transmitted by a second antenna of the wireless earbud.

* * * * *